April 5, 1927.
D. HUMPHREY
1,623,597
BEVERAGE DISPENSING DEVICE
Original Filed Aug. 19, 1922
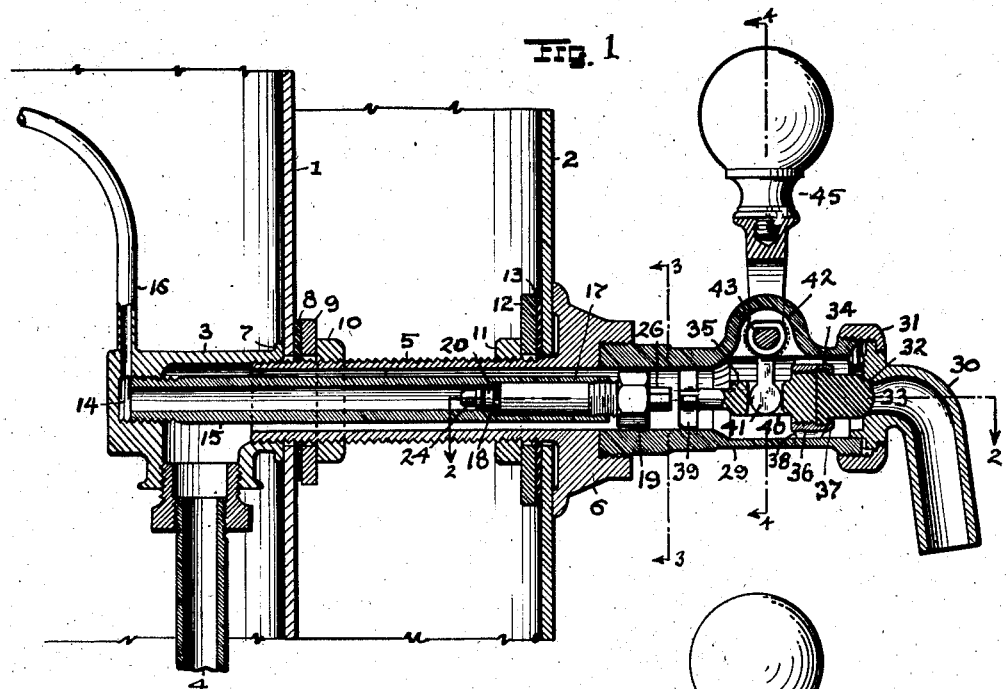
By DAVID HUMPHREY
Attorneys Patented Apr. 5, 1927.

1,623,597

UNITED STATES PATENT OFFICE.

DAVID HUMPHREY, OF CLEVELAND, OHIO; H. J. HUMPHREY EXECUTOR OF SAID DAVID HUMPHREY, DECEASED.

BEVERAGE-DISPENSING DEVICE.

Application filed August 19, 1922, Serial No. 583,012. Renewed February 15, 1927.

This invention relates to beverage dispensing devices and has for an object to provide means for carbonating a liquid during its passage through and at the moment of withdrawal from a dispensing faucet. A further object is to provide means for controlling the flow of liquid and carbonic acid gas in proportionate ratio through a faucet whereby one operation of the faucet lever a drink may be drawn in which the proper amount of carbonating gas is mixed.

In the annexed drawings forming a part of this specification:

Fig. 1 is a vertical section through a portion of the container and the outlet conduit and faucet.

Fig. 2 is an enlarged horizontal section taken on line 2—2 of Fig. 1.

Fig. 3 is a vertical section taken on line 3—3 of Fig. 1.

Fig. 4 is a vertical section taken on line 4—4 of Fig. 1.

As shown in the drawings, the beverage container is mounted within an ice receptacle, a fragmentary portion only of the container wall 1 and receptacle wall 2 being shown in Fig. 1. The outlet conduit through which the beverage is dispensed has an elbow fitting 3 within the container wall 1 to which is connected a downwardly-extending inlet pipe 4. The beverage flows upwardly under pressure through this pipe 4 into fitting 3. A horizontal threaded pipe-section 5, having an integral head 6 engaging the outer side of the wall 2, extends through suitable apertures in the walls 1 and 2 and is screwed into the elbow fitting 3, the outer flange 7 of which is drawn snugly against the inner side of the wall 1. The outer side of wall 2 is engaged by a packing or sealing washer 8 which is clamped in place by a metal washer 9 and a nut 10. Pipe section 5 also carries a nut 11 between which and the wall 2 is clamped a metal washer 12 and a packing washer 13 to make a fluid-tight joint. The rear wall of the elbow fitting 3 is extended or thickened to provide a threaded socket 14 adapted to receive the threaded end of a tube 15 somewhat smaller than the internal diameter of tube 5 and extending axially therein to the front end thereof. Communicating with the rear end of the socket 14 through the upper side thereof is a conduit 16 leading to a suitable supply of carbonic-acid gas. In setting up the apparatus the tube 15 can be screwed back in the socket 14 to partially cut off the inlet passage from the conduit 16, as for instance, when the device is used for dispensing a beverage requiring less gas. The outer end portion 17 of the inner gas tube 15 is bored to a greater internal diameter providing an internal shoulder 18 at the inner end of the portion 17. The outer end of the tube 15 is also internally threaded to receive a threaded plug 19 which has a shouldered inner end and an axial nipple 20. Surrounding the nipple 20 and clamped between the shoulder 18 and the end shoulder on the plug 19 around the nipple is a packing washer 21. The plug 19 has an axial passage therethrough consisting of a large bore 22 extending to adjacent the shouldered inner end and a small bore 23 through the nipple 20. A valve head 24 within the tube 15 at the inner end of the plug 19 has screwed thereon a stem 25 extending forwardly through the plug 19, and the outer end of the stem 25 has a hexagonal head 26 which has a sliding fit in the bore 22 of the plug 19. A compression coil spring 27 surrounding the stem 25 is interposed between the internal shoulder at the inner end of the bore 22 and the enlarged hexagonal head 26 and serves to normally hold the valve head 24 seated on the end of nipple 20. A suitable packing 28 is provided on the face of the valve head to effectively seal the opening.

A faucet body 29 having a bore of the same internal diameter as the pipe 5 is screwed into the head 6 thereof and a separate spout 30 is secured upon the outer end of the body 29 by means of a coupling nut 31. The inner end of the spout 30 has a valve seat 32 against which the rounded end of a valve head 33 fits and this valve head 33 has a peripheral flange 34 at its rear end secured to the threaded end of a stem 35 by means of a coupling collar 36 which has an inturned flange 37 fitting over the flange 34 of the head and an internal thread engaging the enlarged threaded end of the stem 35. The collar 36 has radial external ribs 38 engaging the interior of the faucet body 29 and the rear end of the stem 35 has radial fins 39 engaging the interior of the faucet body 29, these ribs and fins 39 serving to center and guide the valve 33. The main body of the valve stem 35 has a slot 40 therein in which the lower rounded end of a lever arm 41 fits. Lever arm 41 extends into a recess 42 formed in the upper wall of the faucet body 29 and has an apertured end fitting over the flattened inner end of a transversely-extending shaft 43, the outer end of which is fixed to one leg 44 of a forked lever 45. The opposite leg 46 of the lever 45 is pivoted on the round head of a screw 47 outside a spacing washer 48 held in place by the screw 47 which is secured in the faucet body 29 in axial alinement with the shaft 43.

When the valve head 33 is in engagement with the seat 32 the rear end of the stem 35 is spaced slightly apart from the head 26 of the gas-valve stem 27. When the faucet lever 45 is swung forwardly the valve head 33 is moved away from its seat 32 permitting liquid to flow into the spout 30. A further movement to the lever 45 in the same direction brings the rear end of the liquid valve stem 35 into engagement with the head 26 moving the gas valve head 24 rearwardly in opposition to the spring 27, thereby permitting carbonic-acid gas to be injected into the liquid flowing through the faucet. By varying and timing the forward pull on the lever 45 the amount of carbonic gas injected into the liquid may be regulated. As a result the beverage dispensed is always live and effervescent at the moment of withdrawal and there is no time lost or wasted in dispensing a full glass of the beverage, especially with carbonated syrupy mixtures which foam excessively when released and which heretofore have been dispensed in large glasses or mugs in which the beverage is allowed to settle before drinking with obvious losses of carbonic gas during the settling process. On the contrary the device fills a glass quickly and fully without excessive foam and with a full charge of carbonic-acid gas, making a ready and palatable effervescent drink immediately as withdrawn.

What I claim, is:

1. A beverage dispensing faucet having a passage for the flow of beverage therethrough, a main valve for controlling said passage which when open will permit a continuous discharge of the beverage, and a gas connection extending into said passage having a valve seated reversely to said main valve and adapted to be opened thereby to permit carbonated gas to be injected into said passage and the flowing beverage at any desired interval and for any desired duration of time during the discharge of the beverage.

2. A beverage dispensing faucet having a passage for the flow of the beverage therethrough and a passage for carbonating gas communicating therewith, a main valve in said faucet in advance of said gas passage adapted to be opened to permit a continuous discharge of the beverage, an auxiliary valve within the base of said beverage passage and controlling said gas passage, and a single actuating means for operating both valves adapted to open the main valve initially and then the auxiliary valve and to hold both valves open for a continuous flow of beverage and gas through their respective passages, the said valves being axially movable and adapted to engage each other.

3. A beverage dispensing faucet having a passage for the flow of the beverage therethrough and an inlet passage for carbonating gas communicating therewith, a main valve in said faucet in advance of said gas inlet passage, a sliding valve at the mouth of the inlet passage and spaced apart from said main valve, and valve actuating means operble to first impart an opening movement to said main valve and subsequently to said auxiliary valve by contact with said main valve, both valves being constructed and arranged when open to permit a continuous unrestricted flow of both the beverage and the gas.

4. A beverage dispensing faucet comprising an outer tube forming a passage for the beverage, a concentric inner tube having its forward end opening into said outer tube; a longitudinally slidable main valve in the outer tube in advance of the open end of said inner tube, a longitudinally slidable valve in said inner tube, said valves having stems spaced slightly apart when said valves are in closed position, an operating lever connected to said main valve, the stem of said main valve being engageable with the stem of said auxiliary valve to actuate said auxiliary valve during the opening movement of said main valve.

5. A beverage dispensing device, comprising a faucet body having a main passage and a valve therein and a clamping extension at its rear, means associated with said extension adapted to clamp the same to a wall, an intake fitting connected to said extension having means associated therewith adapted to clamp the same to a second wall, said fitting and extension having separate fluid passages communicating with said main passage, and an auxiliary valve controlling one of said passages.

6. A beverage dispensing device, comprising a faucet body having a main discharge passage, a main valve for said passage, a supporting section for said body adapted to be coupled to a double walled receptacle, an intake nipple adapted to be connected to said section having separate intake pipes connected therewith, a tubular member extending from said nipple into said supporting section, and an auxiliary valve within said member adapted to be opened by said main valve.

7. A beverage dispensing device, comprising a faucet body having a main passage, a discharge spout detachably affixed to said body having a valve seat at its inner end, a main valve adapted to engage said seat, a coupling extension for said body having a central tube therein forming separate intake passages communicating with said main passage, and an auxiliary valve at the mouth end of said tube adapted to be opened by said main valve.

8. A beverage dispensing device, comprising a faucet body having a detachable spout at one end thereof, said body having a main longitudinal passage and said spout having a valve seat co-axial with said main passage, a reciprocable valve adapted to engage said seat having a guiding extension within said passage, a pivoted handle having means operably engaging said extension, a coupling section for said body having an intake passage and an intake tube within said passage communicating with the main passage, and a valve for the outlet end of said tube adapted to be engaged by the guiding extension of said main valve.

9. A beverage dispensing device, comprising a faucet body having a main valve therein and an intake coupling extension at one end thereof, a stationary intake tube located within said intake extension, a plug for the end of said tube having a central passage, and a spring pressed valve within said plug operable by said main valve and adapted to open said passage.

10. A beverage dispensing device, comprising a faucet body having a reciprocable main valve therein, a tubular coupling extension for said body having a clamping flange and associated clamping devices adapted to fasten the same to the wall of a receptacle, a stationary intake tube extending through said coupling extension, a tubular screw plug connected with said tube having a valve seat at its inner end, a coiled spring within said plug, and a valve engaging said valve seat having a stem extending through the spring and plug into contact relation with said main valve.

In testimony whereof I affix my signature.

DAVID HUMPHREY.